United States Patent
Waters et al.

(10) Patent No.: US 8,548,495 B2
(45) Date of Patent: Oct. 1, 2013

(54) SYSTEM AND METHOD FOR DETERMINING A POSITION OF A MOBILE WIRELESS DEVICE BY ACCESSING ACCESS POINTS ALAMANACS DATABASE

(75) Inventors: Deric W. Waters, Dallas, TX (US); Sthanunathan Ramakrishnan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 7 days.

(21) Appl. No.: 13/227,844

(22) Filed: Sep. 8, 2011

(65) Prior Publication Data
US 2012/0058778 A1    Mar. 8, 2012

Related U.S. Application Data

(60) Provisional application No. 61/380,874, filed on Sep. 8, 2010.

(51) Int. Cl.
*H04W 24/00* (2009.01)

(52) U.S. Cl.
USPC .......... 455/456.1; 455/404.2; 455/456.3; 455/457; 455/420; 455/422.1; 370/328; 370/331; 370/338

(58) Field of Classification Search
USPC ..... 455/404.2, 412.1–412.2, 420, 456.1–457, 455/550.1, 556.2, 440, 422.1; 370/328, 338, 370/329, 331, 310.2
See application file for complete search history.

(56) References Cited

U.S. PATENT DOCUMENTS

| | | | |
|---|---|---|---|
| 2004/0162086 A1* | 8/2004 | Han | 455/456.1 |
| 2006/0098610 A1* | 5/2006 | Sundberg et al. | 370/338 |
| 2010/0195595 A1* | 8/2010 | Iwata | 370/329 |
| 2012/0115508 A1* | 5/2012 | Moeglein et al. | 455/456.1 |

OTHER PUBLICATIONS

IEEE Standard for Information Technology, "Part 11: Wireless LAN Medium Access Control (MAC) and Physical Layer (PHY) Specifications," IEEE Std 802.11k, Jun. 12, 2008, New York, NY, 243 pages.
IEEE Standard for Information Technology, "Part 11: Wireless LAN Medium Access Control (MAC) and Physical Layer (PHY) Specifications, Amendment 8: IEEE 802.11 Wireless Network Management," IEEE Std 802.11v/D16.0, Nov. 2010, New York, NY, 428 pages.

* cited by examiner

*Primary Examiner* — Vladimir Magloire
*Assistant Examiner* — Babar Sarwar
(74) *Attorney, Agent, or Firm* — Steven A. Shaw; W. James Brady; Frederick J. Telecky, Jr.

(57) ABSTRACT

A system and method for determining a position of a mobile wireless device using wireless local area network access points (APs). In one embodiment, a mobile wireless device includes an AP positioning system configured to estimate a position of the device based on locations of APs disposed about the device. The AP positioning system is configured to: 1) access an AP database; and 2) provide, to the database, one or more medium access controller (MAC) addresses and an area of interest value. The AP positioning system is also configured to retrieve, from the database: 1) location information for each AP having a provided MAC address, or located within the area of interest; and 2) at least one of: signal parameters for the APs nearby the device, a geographic area within which each MAC address can be received, and an indication of a scan type to used for identifying APs.

23 Claims, 2 Drawing Sheets

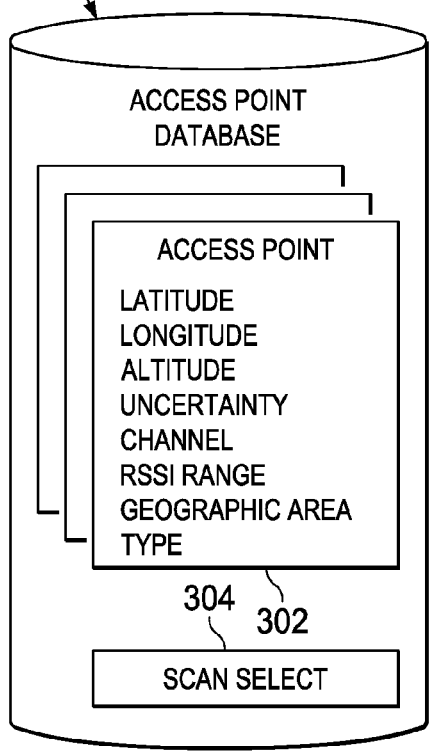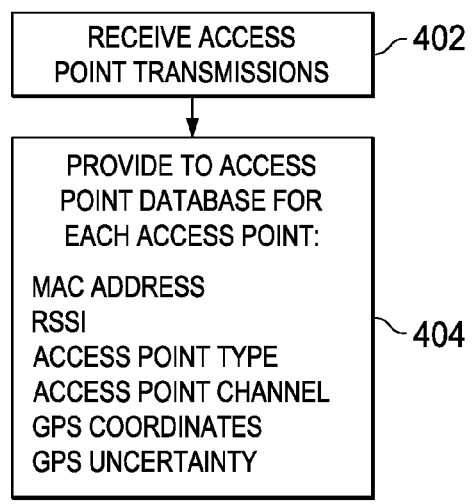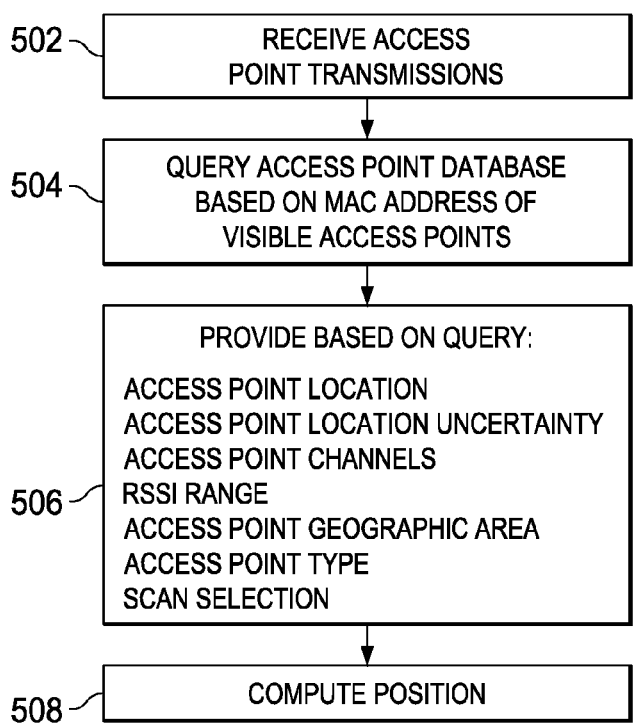

SYSTEM AND METHOD FOR DETERMINING A POSITION OF A MOBILE WIRELESS DEVICE BY ACCESSING ACCESS POINTS ALAMANACS DATABASE

CROSS-REFERENCE TO RELATED APPLICATION

The present application claims priority to U.S. Provisional Patent Application No. 61/380,874, filed on Sep. 8, 2010; which is hereby incorporated herein by reference in its entirety.

BACKGROUND

As mobile devices proliferate, the demand for services tailored to device location also increases. Location based services depend on positioning systems to determine device location. Satellite based position systems, such as the global positioning system (GPS), GLONASS, and Galileo provide high accuracy, but require a clear line of sight between the satellites and the mobile device to provide a position determination. Consequently, satellite positioning systems are largely ineffective for indoor positioning. Satellite positioning also requires specialized receivers that may increase the cost of the mobile device.

As an alternative to satellite based positioning, wireless local area network (WLAN) based positioning systems have been developed. WLAN based positioning systems are suitable for indoor positioning and require minimal investment because they make use of existing infrastructure. Furthermore, many mobile wireless devices include support for communication via WLAN.

WLAN based positioning systems determine mobile device position based on the established positions of WLAN access points visible to the device and the strength of signals exchanged between the mobile device and the access points.

SUMMARY

A system and method for determining a position of a mobile wireless device using wireless local area network access points (APs) are disclosed herein. In one embodiment, a mobile wireless device includes an AP positioning system configured to estimate a position of the mobile wireless device based on locations of wireless local area network APs disposed about the mobile wireless device. The AP positioning system is configured to access an AP database storing AP location information and provide, to the database, one or more medium access controller (MAC) addresses and an area of interest value. The AP positioning system is also configured to retrieve from the database: positioning parameters. The positioning parameters include location information for each AP corresponding to at least one of: the provided MAC addresses and a location within the area of interest. The positioning parameters also include at least one of: signal parameters associated with APs proximate to the wireless device, a geographic area within which each of the MAC address can be received, and an indication of a scan type to use for identifying APs proximate to the wireless device. The access point positioning system is also configured to determine a position based on the positioning parameters.

In another embodiment, a wireless system includes a mobile wireless device. The mobile wireless device is configured to operably communicate with an AP positioning system configured to estimate the positions of APs based on information provided by the mobile wireless device. The mobile wireless device is configured to provide AP positioning information to the AP positioning system. The AP positioning information includes medium access controller (MAC) addresses, received signal strength indication (Rssi) measurements, and satellite positioning system coordinates for the mobile wireless device. The MAC addresses belong to APs positioned about the mobile wireless device. The Rssi measurements are derived from signals transmitted by the APs positioned about the mobile wireless device. The AP positioning information also includes at least one of: a channel frequency on which the MAC addresses are received; beacon information for an AP with which the mobile wireless device cannot communicate; and a satellite positioning system uncertainty value for the satellite position system coordinates.

The wireless system may further include an AP database system comprising the AP position system. The AP database system is configured to store the AP positioning information; and estimate the positions of APs identified by the AP positioning information. The data base is created/maintained by mobile devices providing the aforementioned positioning information. AP locations provided by the database are computed based on similar donations from multiple mobile devices at various times.

In a further embodiment, a wireless device positioning system includes an AP location database. The AP location database is configured to provide AP location information for wireless device positioning. The location information includes at least one of:

channel frequencies actively used by local area networks proximate to an accessing device;

network protocols applicable to APs proximate to the accessing device;

a received signal strength indication range value for APs proximate to the accessing device;

a geographic area within which signals transmitted by an AP proximate to the accessing device are receivable; and an indication of a scan type to use for identifying APs proximate to the accessing device.

In yet another embodiment, a method, includes receiving, by a mobile wireless device, transmissions from one or more wireless local area network APs. The mobile wireless device provides identification and signal strength values for the APs to an AP location database. Responsive to the providing, location information for each of the APs, and a parameter including at least one of signal parameters, a definition of a geographic area, and an indication of a scan type are retrieved from the database. The location information for each of the APs corresponds to the provided MAC addresses. The signal parameters are associated with APs proximate to the mobile wireless device. The geographic area defines a region within which each of the MAC addresses can be received. The indication of a scan type identifies a type of scan used to identify APs proximate to the mobile wireless device. Based on the retrieved location information, a position of the mobile wireless device is estimated.

BRIEF DESCRIPTION OF THE DRAWINGS

For a detailed description of exemplary embodiments of the invention, reference will now be made to the accompanying drawings in which:

FIG. 3 shows a block diagram of an AP database for use with WLAN positioning in accordance with various embodiments;

FIG. 4 shows a flow diagram for a method for creating an AP database for WLAN positioning in accordance with various embodiments; and FIG. 5 shows a flow diagram for a method for using an AP database to determine the position of a mobile wireless device in accordance with various embodiments.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In order for a mobile wireless device to implement wireless local area network (WLAN) based positioning, the device accesses either a server which computes the location and returns it to the device along with a location uncertainty value, or the device accesses a database of access point (AP) locations and uncertainties. Conventional WLAN positioning systems employ the server option. Such systems respond with an estimated position when the mobile wireless device provides a set of received signal strength indicator (Rssi) measurements and corresponding media access controller (MAC) addresses for WLAN access points.

Figure 1:
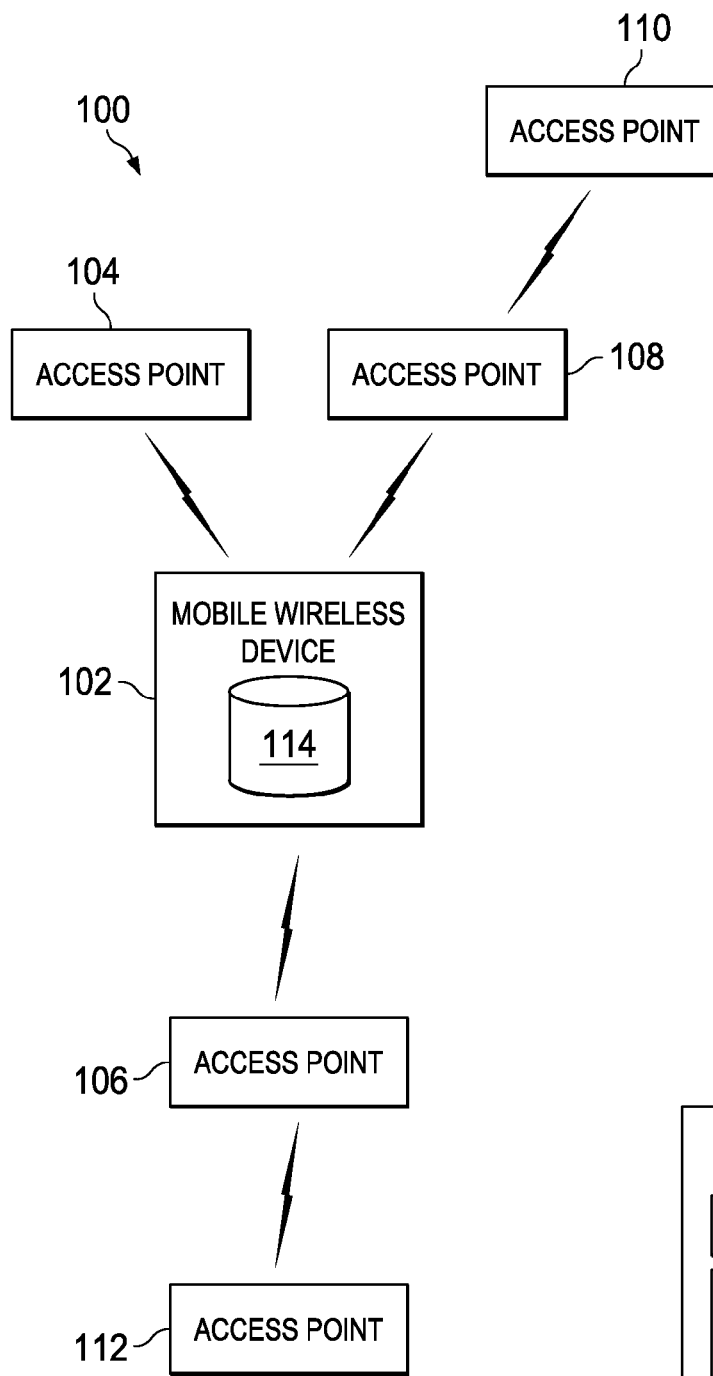
FIG. 1 shows a block diagram of a system for using wireless local area network (WLAN) access points (APs) to determine the position of a wireless device in accordance with various embodiments.

FIG. 1 shows a block diagram of a system 100 for using wireless local area network (WLAN) access points to determine the position of a wireless device in accordance with various embodiments. The system 100 includes a mobile wireless device 102 and a plurality of WLAN access points 104-112. The mobile wireless device 102 is positioned to wirelessly communicate with one or more of the access points 104-112 each associated with a WLAN. In the embodiment of FIG. 1, the mobile wireless device 100 is positioned to receive transmissions from and/or communicate with any of the access points 104-108. The access points 110, 112 are not directly visible to (e.g., are out of communication range of) the mobile wireless device 102, but may be indirectly visible to the mobile wireless device 102 through access points 106, 108 that are within range of the access points 110, 112. The mobile wireless device 102 may be cellular telephone, a tablet computer, or any other mobile computing device.

The mobile wireless device 102 includes a database 114 that stores and provides access point 104-112 location information in response to a positioning information query. In some cases the AP database 114 may be incomplete so that it doesn't have information about every AP. In other embodiments, the database 114 is located in a different device. In some embodiments of the system 100, the database 114 is accessed though a server that may be disposed in the mobile wireless device 102 or accessed through a WLAN. The database 114 may include an AP positioning system that estimates the positions of APs based on information provided by the mobile wireless device 102 and other mobile wireless devices, such as device location, AP signal strength, etc. The mobile wireless device 102 provides, to the database 114, an Rssi value and a MAC address of at least one access point 104-112 to be used to determine the position of the device 102. The server may compute a location and send the mobile wireless device 102 an estimated position and associated uncertainty. The position solution may or may not include altitude value.

In embodiments of the system 100 in which the database 114 is disposed on the device 102, the database 114 is periodically updated to account for addition and/or relocation of access points. Mobile wireless devices may provide the updated information on detection of an access point.

Figure 2:
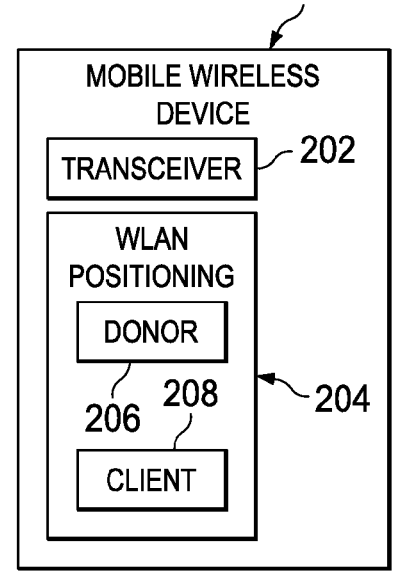
FIG. 2 shows a block diagram of a mobile device configured to perform WLAN positioning by accessing an AP database in accordance with various embodiments.

FIG. 2 shows a block diagram of an embodiment of the mobile wireless device 102, which is configured to perform WLAN positioning by referencing the access point database 114. The mobile wireless device 102 includes a wireless transceiver 202 and a WLAN positioning block 204. The transceiver 202 is configured for accessing a WLAN. The transceiver 102 may be configured to allow the device 102 to access a WLAN in accordance with one or more IEEE 802.11 standards (e.g., IEEE 802.11a/b/g/n). The mobile wireless device 102 may also include other wireless communications systems, such as a satellite positioning system receiver (e.g., a GPS receiver), a wide area network transceiver, etc.

The WLAN positioning block 204 performs WLAN positioning operations, such as generating location/positioning estimates, for the device 102. The WLAN positioning block 204 may include a donor block 206 and a client block 208. The donor block 206 provides information to the database 114 for use in positioning. In embodiments in which the mobile wireless device 102 serves only as an information donor, the device 102 may require no response (i.e., retrieve no access point location information) from the database 114 when providing information to populate the database 114.

The donor block 206 may provide to the database 114 one or more of a MAC address and Rssi value for each access point in communication with the device 102. The donor block 206 may also provide satellite positioning coordinates (e.g. GPS coordinates) for the device 102, a value specifying an uncertainty of the provided satellite positioning coordinates, the altitude of the device 102, the type or protocol standard applicable to the access point (e.g., IEEE 802.11a/b/g/n), and the network radio frequency (RF) channel on which the access point (i.e., the MAC address) was detected. The satellite positioning coordinates may be provided as longitude and latitude values or other coordinate system values.

Some embodiments of the donor block 204 also provide information to the database 114 regarding access points 110, 112 that are not directly visible to the device 102, but are directly visible to another access point 106, 108 that is directly visible to the device 102. The donor block 206 can acquire information related to the access points 110, 112 via beacon reports as defined in Section 5.2.7.1 of the IEEE 802.11k specification. By providing information regarding the access points 110, 112 to the database 114, the database gains information concerning which access points are visible to each other access point. Such information allows access point locations to be estimated more accurately.

The donor block 206 may provide at least some of the information extracted from or related to a beacon report to the database 114 for use in positioning. Such information includes:
  Regulatory class=channel set for which the measurement request applies.
  Channel number=channel number to which measurement report applies.
  Actual measurement start time=value of measuring station's Timing Synchronization Function (TSF) timer at start of reception.
  Measurement Duration=duration over which the beacon report was measured.
  Reported frame information (Frame Type)=could be beacon or probe response or measurement pilot frame
  Reported frame information (PHY)=indicates the physical medium type.
  RCPI=received channel power.
  RSNI=received signal to noise indication.
  BSSID=identifies the sender of beacon frame that is measured.
  Antenna ID=identifying number for antenna(s) used for the measurement.
  Parent TSF=measuring station's TSF timer value at start of reception.

The client block 208 interacts with the access point database 114 to perform mobile wireless device positioning, and may operate in parallel with the donor block 206. When the WLAN positioning block 204 is determining the location of the device 102, the client block 208 retrieves the locations and location uncertainty values of selected access points from the database 114. More specifically, the client block 208 retrieves or causes to be retrieved, from the database 114, location data for one or more access points 104-108 that are communicatively visible to the mobile wireless device 102. Other information used to make a position determination, such as range estimates, Rssi measurements, etc.) can be generated by the mobile wireless device 102 without access to the database 114.

To retrieve access point location information, the client block 208 provides, to the database 114, selection information, such as a MAC address, for each access point for which location information from the database 114 is desired. In some embodiments, the client block 208 may provide, to the database 114, a distance value defining an area about the device 102 within which the access point location data is desired. The client block 208 may provide a location from which the distance is measured, or the server for the database can estimate the location from the MAC addresses provided. Together the location provided by the client block 208 or computed by the server along with the distance value define the area of interest within which all AP location information is useful to the client block 208. If the client block 208 provides a distance value of zero, then the client block 208 is requesting only the information for the MAC addresses it provided. If the client block 208 does not provide a distance value the database 114 can assume a default value. In response to the access point location information query, the database 114 provides access point locations and uncertainty values. Some embodiments may provide such information for access points expressly identified in the query (e.g., by MAC address). Some embodiments may provide location information for expressly identified access points and/or for other access points known to be in the vicinity of the mobile wireless device 102. The vicinity may be defined based on the provided MAC addresses.

The database 114 can provide, based on an access point location query initiated by the device 102, and the mobile wireless device 102 can retrieve from the database 114, a variety of information values useful for determining the position of the device 102. FIG. 3 shows a block diagram of the access point database 114 used to perform WLAN positioning in accordance with various embodiments. The database 114 includes information records 302 containing positioning data for one or more access points. At least some of the position data may be provided to the mobile wireless device 102 (or other positioning engine) in response to an access point location query for use in device 102 position determinations.

The positioning data may include access point location information, such as positioning coordinates (e.g., latitude, longitude, and/or altitude) for each access point (i.e., each MAC address). The database 114 may respond to a query by returning such location information for each access point identified in a query. For example, the database 114 may generate a message containing both the MAC address and the latitude, longitude, and/or altitude for an identified access point. If the database 114 lacks location information for a requested access point, then the database 114 will generate a message that informs the device 102 of the lack of information. The location information for each access point may also include a location uncertainty value. In some embodiments the uncertainty value is a radius value, and the corresponding access point is estimated to be located somewhere within a circle in the horizontal plane having the radius centered at the given coordinates. A larger radius indicates a higher location uncertainty. Similarly, the uncertainty could be the radius of a sphere centered at the given coordinates.

The positioning data may also include signal parameters associated with each access point. The signal parameters may include a variety of values related to the access point communication capabilities. In some embodiments, the signal parameters include one or more of Rssi range, active access point RF channels, and access point type. Rssi range may include a maximum and/or minimum Rssi value measured for the access point. The mobile wireless device 102 can improve positioning performance by using the maximum Rssi value to establish a maximum range to the access point. The maximum Rssi value and/or the minimum Rssi value can also be used to calibrate device 102 Rssi measurements to the Rssi measurements provided in the database 114.

The active access point channels provide information regarding what radio channels are being used by each access point proximate to the mobile wireless device 102. Some embodiments of the database 114 provide channel information for each access point. Some embodiments may provide for one or more RF channels a count of the total number of access points using each channel. The mobile wireless device 102 can apply the active channel information to improve power utilization by avoiding scanning of inactive channels.

The access point type provides information regarding standards and/or protocols applicable to each access point. For example, the access point type may specify with which of the IEEE 802.11a/b/g/n standards an access point is compliant. The mobile wireless device 102 can tailor its scanning behavior based on the types of the nearby access points.

The database 114 may also provide information regarding the geographic area in which each access point has been previously detected. If the mobile wireless device 102 is detecting the access point, then device 102 is likely within the geographic area defined by the database 114. The database 114 may define the geographic area in any number of ways. For example, the area may be circular as defined by a radius value, square, elliptical, defined by contours, etc.

Some embodiments of the database 114 may provide information indicating a preferred scanning method for use in identifying access points in the vicinity of the mobile wireless device 102. For example, the mobile wireless device 102 may actively scan (e.g., issue transmissions requesting access point response) or passively scan (listen for access point activity) for access points. A scan select value 302 provided by the database 114 may indicate which scanning method may be most effective and/or efficient for the mobile wireless device 102. In some embodiments, the scan select value may specify a number of devices proximate to the mobile wireless device 102 that are requesting location information from the database 114. As the number of devices in the area requesting location information increases, the need for the mobile wireless device 102 to actively scan for access points may decrease.

Various components of the wireless device 102, and the database 114 and associated server, including at least some portions of the WLAN positioning block 204, the donor block 206, and the client block 208 can be implemented using a processor executing software programming that causes the processor to perform the operations described herein. In some embodiments, a processor executing software programming can generate queries to the database 114 and/or retrieve access point location information from the database 114 and/or provide access point location information from the database 114, and/or determine device 102 location based on access point location information retrieved from the database 114 as described herein.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, read-only-memory, or combinations thereof. The access point location information 302, 304 of the access point database 114 may be stored in a computer-readable medium.

Some embodiments can implement portions of the wireless device 102, including portions of the WLAN positioning block 204 and/or the database 114, using dedicated circuitry (e.g., dedicated circuitry implemented in an integrated circuit). Some embodiments may use a combination of dedicated circuitry and a processor executing suitable software. For example, some portions of the WLAN positioning block 204 and/or the database 114 may be implemented using a processor or hardware circuitry. Selection of a hardware or processor/software implementation of embodiments is a design choice based on a variety of factors, such as cost, time to implement, and the ability to incorporate changed or additional functionality in the future.

FIG. 4 shows a flow diagram for a method 400 for creating and/or populating an access point database 114 for WLAN positioning in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400, as well as other operations described herein, can be implemented by a processor executing instructions stored in a computer readable medium.

In block 402, the mobile wireless device 102 is receiving transmissions from access points 104-108 located in the vicinity of the device 102. In block 404, the donor block 206 contributes to the construction of the WLAN access point location information database 114 by providing information regarding the access points 104-108 to the database 114. The donor block 206 may generate messages that are transmitted to the database 114. The information contained in the messages may include a MAC address and Rssi value for each access point detected, a type or standard applicable to each access point, a radio channel on which the access point was detected, satellite positioning coordinates and/or position uncertainty for the device 102, beacon related information for directly or indirectly visible access points, the time the measurement was taken, or other information disclosed herein. The database 114 receives and stores the access point information provided by the donor block 206 for later provision to devices requesting location information for the access points.

FIG. 5 shows a flow diagram for a method 500 for using an access point database 114 to determine the position of the mobile wireless device 102 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500, as well as other operations described herein, can be implemented by a processor executing instructions stored in a computer readable medium.

In block 502, the mobile wireless device 102 is receiving transmissions from access points 104-108 located in the vicinity of the device 102. The WLAN positioning block 204 initiates determination of device 102 position based on the relative locations of the access points 104-108.

In block 504, the positioning client block 208 generates a query message to be communicated to the access point location database 114. The query message may include the MAC addresses and/or the measured Rssi values of one or more of the access points 104-108.

In block 506, the database 114 responds to the query and provides to the WLAN positioning block 204 positioning information for the identified access points. The positioning information may include one or more of access point location values, access point location uncertainty values, radio channels actively used by access points, Rssi range values, access point type values, access point geographic area definitions, and a scan selection value.

In block 508, the WLAN positioning block 204 retrieves the access point location information from the database 114 and uses the information in conjunction with information generated in the mobile wireless device 102 (e.g., access point signal strength values) to estimate the position of the device 102.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless system, comprising:
   a mobile wireless device configured to operably communicate with an access point (AP) positioning system configured to estimate a position of APs based on information provided by the mobile wireless device;
   wherein the mobile device is configured to provide AP positioning information obtained from a signal received from a first AP to the AP positioning system, the AP positioning information comprising:
   medium access controller (MAC) address of the first AP;
   received signal strength indication (RSSI) measurement of the signal transmitted by the first AP as measured by the wireless device;
   coordinates of the location of the mobile wireless device as computed by the mobile wireless device; and
   a channel frequency on which the signal was received;
   beacon information received from the first AP containing information about a second AP; and
   an uncertainty value for the coordinates of the location of the mobile wireless device, wherein the uncertainty value is an uncertainty in an estimate of a position of the mobile wireless device represented as a radius of a circle with the mobile wireless device at the center of the circle.

2. The wireless system of claim 1, wherein the mobile device wireless is configured to provide, to the AP positioning system, the satellite positioning system uncertainty value.

3. The wireless system of claim 1, wherein coordinates comprise altitude of the mobile wireless device.

4. The wireless system of claim 1, further comprising an AP database system comprising the AP positioning system, wherein the AP database system is configured to:
   store the AP positioning information; and estimate the positions of APs identified by the AP positioning information.

5. The wireless system of claim 1, wherein signals sent by the second AP are too weak to be recovered by the mobile wireless device, but strong enough to be recovered by the first AP.

6. The wireless system of claim 1, wherein the information about the second AP comprising:
   a MAC address of the second AP;
   a channel frequency of the second AP; and
   a RSSI of the second AP as measured by the first AP.

7. A mobile wireless device, comprising:
   positioning system configured to estimate a position of the mobile wireless device based on locations of wireless local area network access points (APs) disposed about the mobile wireless device;
   wherein the positioning system is further configured to:
   access an AP database storing AP location information;
   provide, to the database, one or more medium access controller (MAC) addresses and a value indicating an area of interest; and
   retrieve from the database:
   signal parameters comprising an identification of a protocol standard applicable to an AP proximate to the wireless device
   positioning parameters corresponding to the APs whose location is within the area of interest, the positioning parameters, comprising:
   AP location and AP location uncertainty value, wherein the uncertainty value is an uncertainty in an estimate of a position of the AP represented as a radius of a circle with the AP at the center of the circle.

8. The mobile wireless device of claim 7, wherein positioning parameters further comprise channel frequency of the corresponding APs.

9. The mobile wireless device of claim 8, wherein the positioning parameters further comprise the number of APs available on a channel frequency within the area of interest.

10. The mobile wireless device of claim 7, wherein the positioning system is configured to access the AP database storing AP location information and determine a position by retrieving from the database the signal parameters, and the signal parameters comprise a maximum received signal strength indication value (RSSI) for an AP proximate to the wireless device.

11. The mobile wireless device of claim 7, wherein the positioning system is configured to access the AP database storing AP location information and determine a position by retrieving from the database the signal parameters, and the signal parameters comprise a minimum received signal strength indication value for an AP proximate to the wireless device.

12. The mobile wireless device of claim 7, wherein the identification of a protocol standard comprises at least one of identification of a protocol standard for APs in the area of interest and a number of APs applying a given protocol standard in the area of interest.

13. The mobile wireless device of claim 7, wherein the positioning system is further configured to determine the position of the mobile wireless device by retrieving from the database the indication of a scan type, and the indication of a scan type selectively indicates which of an active scan and a passive scan is to be performed by the mobile wireless device to identify APs.

14. The mobile wireless device of claim 7, wherein the positioning system is further configured determine the position of the mobile wireless device by retrieving from the database the indication of a scan type, and the indication of scan type comprises a value indicating a number of other wireless devices, proximate to the mobile wireless device, accessing the database.

15. The mobile wireless device of claim 7, wherein the location information for each AP comprises an altitude for each AP.

16. A wireless local area network based positioning system, comprising:
   an access point AP location database configured:
   to populate the database with access point location parameters provided by accessing devices, the parameters comprising:
   medium access controller addresses;
   received signal strength indicator measurements;
   coordinates of the location of the accessing device as computed by the accessing device; and
   a value representing an uncertainty value in the computed location of the accessing device, wherein the uncertainty value is an uncertainty in an estimate of a position of the accessing device represented as a radius of a circle with the accessing device at the center of the circle;

to provide access point location information to the accessing device, the location information corresponding to the AP comprising the MAC address of the AP, coordinates of the estimated location of the AP and a value representing an uncertainty value of the estimated AP location and the accessing device, wherein the uncertainty value is an uncertainty in an estimate of a position of the AP represented as a radius of a circle with the AP at the center of the circle.

17. The positioning system of claim 16, wherein the location information further comprises a received signal strength indication range value, and the received signal strength indication range value comprises at least one of a minimum received signal strength indication value and a maximum received signal strength indication value.

18. The positioning system of claim 16, wherein the location information further comprises a value indicating a number of other accessing devices, in proximity to the accessing device, accessing the database.

19. The positioning system of claim 16, wherein parameters comprise the satellite positioning uncertainty value, and the satellite positioning uncertainty value comprises one of a radius of uncertainty and a number of satellites used to determine the satellite positioning coordinates.

20. A method, comprising:
receiving, by a mobile wireless device, transmissions from one or more wireless local area network access points (APs);
providing, by the mobile wireless device, identification and signal strength values for the APs to an AP location database;
retrieving from the database, responsive to the providing, AP location information for each of the APs corresponding to one of the provided MAC addresses; the AP location information comprising coordinates of the estimated AP location and an uncertainty value of the AP location, wherein the uncertainty value is an uncertainty in an estimate of a position of the AP represented as a radius of a circle with the AP at the center of the circle;
an indication of a scan type which selectively indicates which of an active scan and a passive scan is to be performed by the mobile wireless device to identify APs; and
estimating a position of the mobile wireless device based on the location information.

21. The method of claim 20, further comprising providing, by the mobile wireless device, to the access point location database, at least one of:
a value indicating a degree of uncertainty of a satellite positioning system derived location of the mobile wireless device; and
a channel frequency on which each of the MAC addresses are received.

22. The method of claim 21, wherein the value indicating a degree of uncertainty is provided to the access point location database, and the value indicating a degree of uncertainty comprises at least one of a number of satellites used to generate the satellite positioning system coordinates, and a radius of uncertainty value.

23. The method of claim 20, wherein the signal parameters comprise at least one of:
channel frequencies actively used by wireless networks in the proximity of the mobile wireless device;
a maximum received signal strength indication value for an AP proximate to the mobile wireless device;
a minimum received signal strength indication value for an AP proximate to the mobile wireless device; and
identification of a protocol standard applicable to a AP in the vicinity of the mobile wireless device.

* * * * *